July 27, 1948.   C. DUMELIN   2,445,910
TOE COUPLING FOR ARTIFICIAL FEET
Filed March 8, 1946

Charles Dumelin
INVENTOR.

Patented July 27, 1948

2,445,910

UNITED STATES PATENT OFFICE 2,445,910

TOE COUPLING FOR ARTIFICIAL FEET

Charles Dumelin, Detroit, Mich.

Application March 8, 1946, Serial No. 653,098

2 Claims. (Cl. 3—6)

My present invention relates to a toe coupling adapted for artificial feet and the object is to provide a resilient toe section of the foot.

Another object of the invention is to provide a soft rubber cushion across the forward position of the foot and pivotally coupling the parts by means of a cap screw extending into a tapped lever having a ball shaped end, the ball shaped end of the lever being seated in a countersunk hole provided in the socket plate.

The invention consists in a coupling for the purpose specified, which is simple in construction and operation, efficient in use and which is constructed as hereinafter described and claimed.

Figure 1:
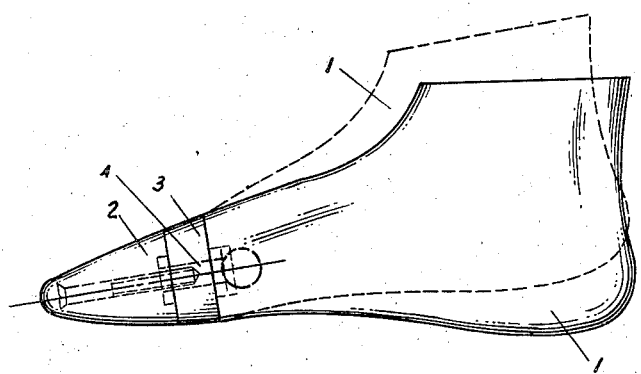
Fig. 1 illustrates an elevation view of an artificial foot with the coupling between the arch section of the foot and toe section.
Figure 8:
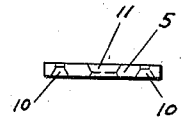
Fig. 7 and Fig. 8 are elevation views of a socket plate with a countersunk hole to receive the ball shaped lever.
Figure 7:
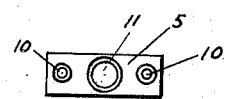

In said drawing I denote 1 as an arch section of an artificial foot and 2 is a toe section.

The coupling as shown consists of a soft rubber cushion, a lever with a ball shaped end seated in a countersunk hole in a socket plate and extending through the rubber cushion. A cap screw inserted from the front of the toe section and received by the tapped end of the lever holds the parts flexibly together. The opposite sides of the rubber cushion are provided with shoulders 7 adapted to be seated in recesses in the arch section of the artificial foot and toe section. Socket plate 5 is provided with countersunk hole 11 and countersunk holes 10.

The coupling consists of a soft rubber cushion 3, lever 4, socket plate 5, cap screw 6, and screws 12.

Figure 2:
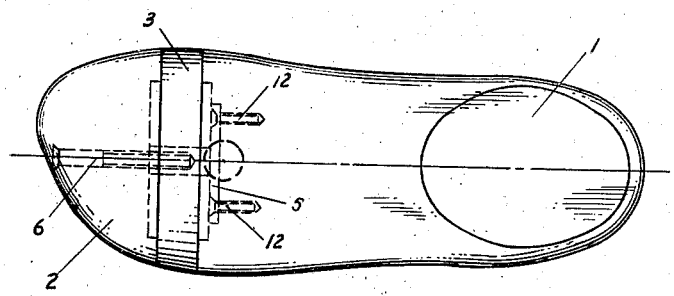
Fig. 2 is a horizontal view of the artificial foot with the coupling seated in its relative position.
Figure 9:
Figure 3:
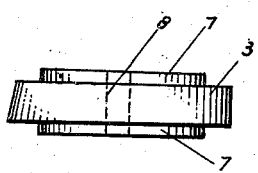
Fig. 3 and Fig. 4 are elevation views of the rubber cushion.
Figure 5:
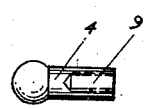
Fig. 5 and Fig. 6 are elevation views of the lever with a ball shaped end and a tapped part to receive a cap screw.
Figure 6:
Figure 4:
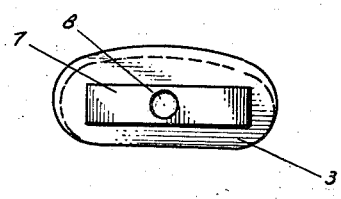

The parts are assembled as indicated in Fig. 1 and Fig. 2 of the drawing. Tapped end of the lever is inserted through hole 11 of socket plate 5 and said latter are secured into a recess in the arch section of the artificial foot.

Ball lever 4 is inserted through recess 11 of retainer plate 5; retainer plate and ball lever together are secured into a recess of the foot with screws 12 inserted through holes 10. Tapped end 9 of the ball lever is inserted through hole 8 of the rubber cushion. Shoulders 7 are seated in the recesses provided in the arch section of the foot and toe section, cap screw 6 extending into tapped part of the lever and tightening the parts flexibly together.

Further the coupling is set to provide a resilient movement while walking.

From the above it can be seen I have provided an exceptionally efficient, strong and inexpensive coupling for the purpose intended.

What I claim and desire to secure by Letters Patent is:

1. A toe coupling adapted to be inserted between a toe section and an arch section of an artificial foot comprising a soft rubber cushion with the outer contour lines to conform with the shape of the foot, the opposite faces having shoulders adapted to be seated in recesses of the toe and foot construction, means comprising a control lever with a ball shaped end inserted through a counter sunk hole in a retainer plate and rotate thereabout to control the toe movement, said retainer plate being secured into a recess of the artificial foot, the other end of the lever being tapped and extending through the rubber cushion, a set screw received by the tapped end of the lever and holding the toe section about the rubber cushion to provide a resilient walking movement.

2. A toe coupling adapted to be inserted between a toe section and an arch section of an artificial foot comprising a soft rubber cushion with shoulders on the opposite faces disposed to be seated in recesses in the toe and foot construction, a control lever having one end tapped and the other end being ball shaped and received by a countersunk hole in a retainer plate, said plate being secured into a recess in the arch section of the artificial foot, the rubber cushion provided with a hole to receive the control lever, said rubber cushion being received by the recesses of the toe and foot construction and with a set screw tightening the parts together, the control lever seated behind the retainer plate being so disposed to function with the toe movement while walking or stepping in any direction.

CHARLES DUMELIN.

REFERENCES CITED

The following references are of record in the file of this patent:

UNITED STATES PATENTS

| Number | Name | Date |
|---|---|---|
| 409,311 | Snyder | Aug. 20, 1889 |
| 2,181,031 | Thompson | Nov. 21, 1939 |